United States Patent [19]
Bendler et al.

[11] 3,873,125
[45] Mar. 25, 1975

[54] SAFETY DEVICE FOR AUTOMOTIVE VEHICLES

[75] Inventors: Hellmut Bendler, Nurnberg; Egon Flach, Koln; Axel Homburg, Troisdorf, all of Germany

[73] Assignee: Dynamit Nobel Aktiengesellschaft, Troisdorf, Germany

[22] Filed: July 20, 1973

[21] Appl. No.: 381,007

[30] Foreign Application Priority Data
July 22, 1972 Germany............................ 2236139

[52] U.S. Cl......................... 280/150 AB, 280/87 R
[51] Int. Cl.............................................. B60r 21/08
[58] Field of Search.................... 280/87 R, 150 AB

[56] References Cited
UNITED STATES PATENTS
2,899,214  8/1959  D'Antini................... 280/150 AB X
3,580,603  5/1971  Chute.......................... 280/150 AB
FOREIGN PATENTS OR APPLICATIONS
609,624  5/1959  Italy............................ 280/150 AB

*Primary Examiner*—Robert B. Reeves
*Assistant Examiner*—Frederick R. Handren
*Attorney, Agent, or Firm*—Craig & Antonelli

[57] ABSTRACT

A gas conducting arrangement for conducting inflating gas from a pressure generating mechanism to an inflatable gas cushion arranged at the steering wheel by way of a hollow space formed in the steering column. A connecting pipe leading from the pressure generating mechanism opens into the hollow space in the steering column in a gas entrance zone, with the connection pipe extending at an angle, preferably at right angles, to the longitudinally extending hollow space in the steering column. The cross section of the hollow space in the steering column is smaller than the cross section of the connection pipe with the hollow space in the steering column being windened conically in a transition zone adjacent the gas entrance zone so that, in the gas entrance zone, the cross sectional area of the hollow space in the steering column is at least as great as the flow cross section of the connection pipe so as to minimize obstruction to the flow from the connection pipe into the steering column. In the area of the gas entrance zone, the steering column is constructed with grid-like struts which permit flow through of the inflating gases and which also serve as intentional buckling points in the case of axial forces on the steering column.

16 Claims, 3 Drawing Figures

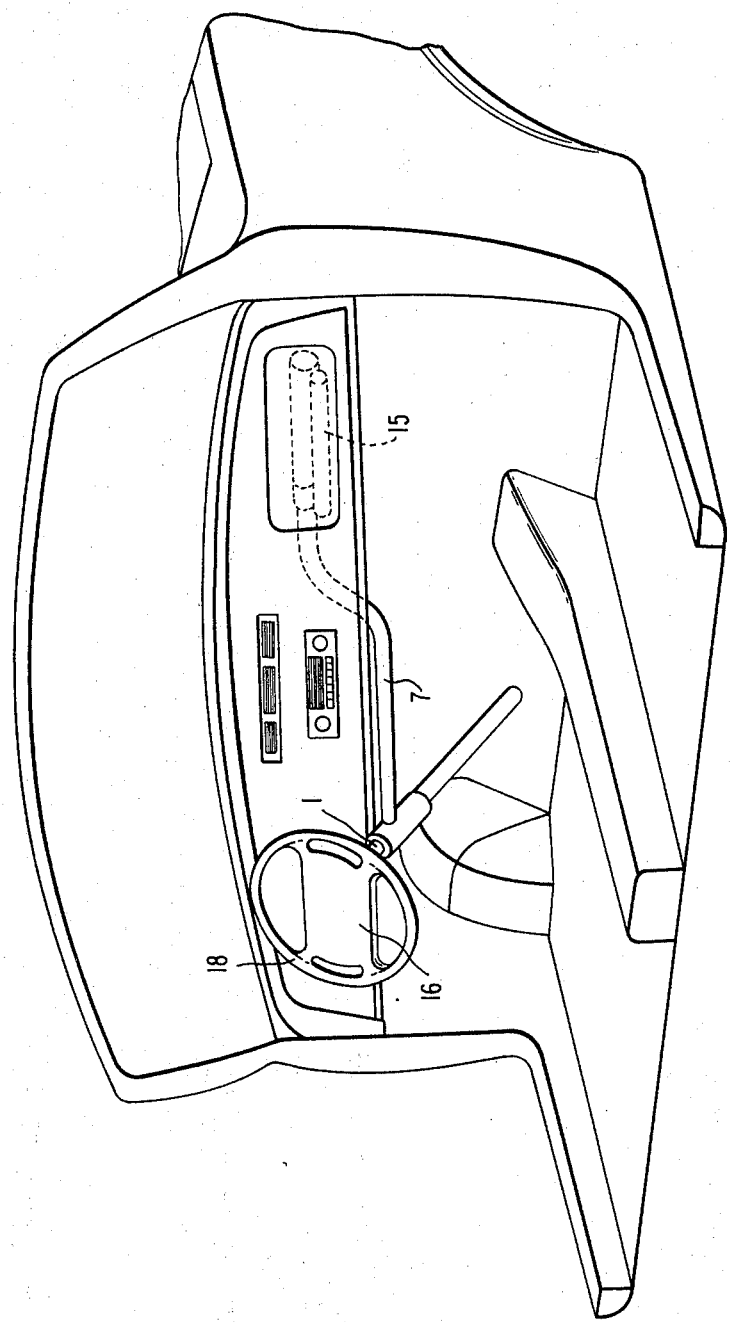

SAFETY DEVICE FOR AUTOMOTIVE VEHICLES

BACKGROUND AND SUMMARY OF THE INVENTION

The present invention relates to a safety device for automotive vehicles with an inflatable bag and a pressure-generating mechanism, wherein the compressed air and/or the gas flow through the steering column, which is constructed to be hollow, from the pressure-generating mechanism to the bag to be inflated.

In safety devices for automotive vehicles, mechanisms are known which, upon an impact of the vehicle, inflate within fractions of a second containers, e.g., bags of a synethetic resin fabric, with compressed air or gas. These bags are arranged normally for the front-seat passenger in or under the dashboard, for the driver in the steering wheel rim and, for the back seats, in the backrest of the front seats.

In case the bag for the driver is arranged in the steering wheel rim, it is constructionally advantageous to effect the inflation of the bag through a steering column formed as a tube (pipe). In such an arrangement, the point requiring special consideration is a satisfactory guidance of the gas at the point of the sterring column at which there is the transition from the supply line originating from the gas generator to the rotatable steering column. In this connection, it is unimportant whether separate pressure sources or a common pressure source are employed for the driver's and the front-seat passenger's sides.

The present invention is concerned with the construction of the steering column in the gas feed zone and serves the purpose of constructing the steering column so that a maximally unhindered and loss-free gaseous flow is made possible from the pressure-generating mechanism to the bag to be inflated.

It is contemplated by the present invention to provide the connection pipe for the gas feed into the steering column at an angle to the longitudinal axis of the steering column and to widen the flow cross section of the steering column, which latter is constructed with a smaller flow cross section than the connection pipe in the point of entrance of the gas at least to the flow cross section of the connection pipe. By means of the construction of the steering column in the gas entrance zone according to the present invention, a pressure dam-up (pressure stagnation) of the gas and thus a drop in the velocity of the gaseous flow is extensively avoided. Consequently, the free passage (throughflow) of the gas and the functioning of the safety device are ensured.

In accordance with a further feature contemplated by the present invention, the steering column is fashioned with grid-like struts in the gas entrance zone. Such a construction of the steering column fulfills also the further purpose of providing that the steering column can be buckled (compressed) in the axial direction in the gas entrance zone, so that, in case of an impact of the vehicle, the steering column can yield.

The construction of the steering column in accordance with preferred embodiments of this invention can be realized by conically widening the flow cross section of the steering column in the transition to the gas entrance zone. It is particularly advantageous to widen the flow cross section of the steering column so that the widening extends beyond the entrance cross section of the connection pipe. In this way, a gas stagnation (damming) in the entrance zone is extensively avoided, and the free passage of the gas is enhanced. The grid-like struts, however, are disposed between the rim of the conically widened portion and the part of the steering column which does not receive any gas flow and is sealed off with respect to the gas entrance zone.

In order to ensure the movability of the steering column, the present invention contemplates forming the connection pipe with a sleeve encompassing the steering column in the gas entrance zone; the steering column being sealingly and rotatably supported in this sleeve. In this connection, it is also contemplated by the present invention to construct the sleeve in practice as a double sleeve, one part serving for sealing puposes and the other for mounting purposes.

These and further objects, features and advantages of the present invention will become more obvious from the following description when taken in connection with the accompanying drawings which show, for purposes of illustration only, several embodiments in accordance with the present invention. cl BRIEF DESCRIPTION OF THE DRAWINGS FIG. 1 is a perspective view which shows a schematic arrangement of an automotive vehicle with a safety device constructed in accordance with the present invention; and FIGS. 2 and 3 are detail part cross sectional views which show two different embodiments of the steering column and gas entrance zone constructed in accordance with the present invention.

DETAILED DESCRIPTION OF THE DRAWINGS

FIG. 1 shows schematically the steering arrangement of an automobile, wherein the inflatable safety bag 16 is disposed in the area of the steering wheel rim 18. The gas is fed from the pressure-generating mechanism 15 via the connection pipe 7 through the hollow steering column 1.

Figure 2:
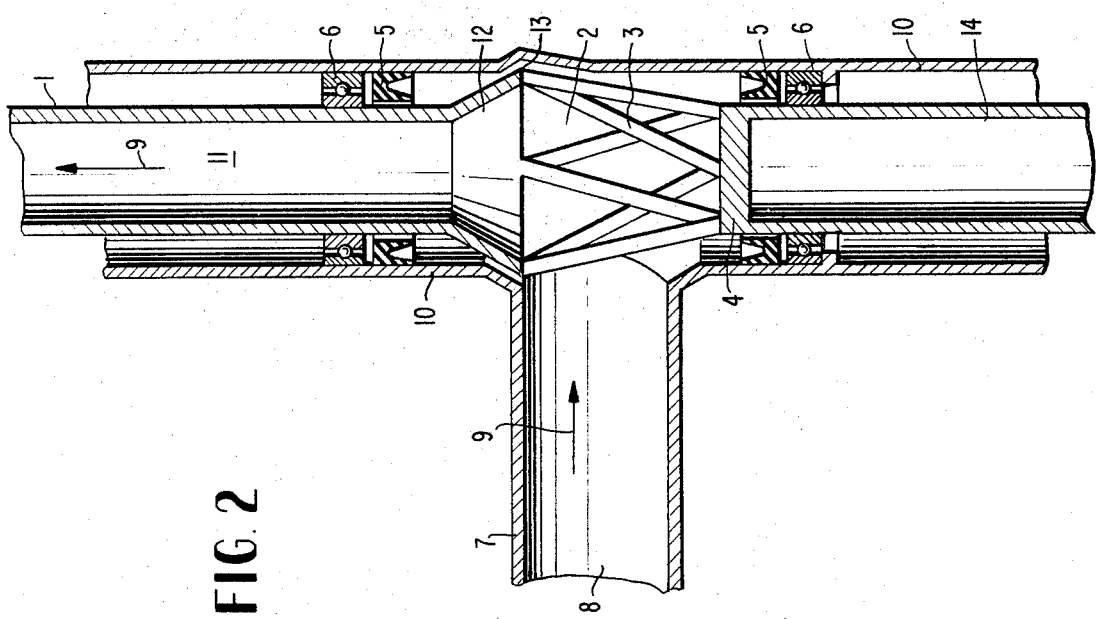

The construction of the steering column 1 in the gas entrance zone for the purpose of avoiding constrictions in cross section is illustrated in FIG. 2. The gas flows from the pressure generator, not show, in the direction of arrow 9 through the connection pipe 7 having the flow cross section 8 into the steering column 1 having the flow cross section 11. The part 14 of the steering column pointing toward the chassis is sealed off toward the gas entrance zone 2 at the front or end face 4. The flow cross section 11 of the steering column, which is somewhat smaller than the flow cross section 8 of the connection pipe, is conically widened toward the gas entrance zone 2. This conically widened portion 12 is to be at least so large that the entrance cross section 8 of the connection pipe 7 is no larger than this widened portion. Struts or stays 3 lead, in the form of a grid, from the rim 13 of the conically widened portion 12 to the part 14 of the steering column lying below the gas entrance zone 2. These struts 3, which take over the steering forces, lead from the widened portion 12 of the steering column back to the original diameter. The free passage through the struts 3 for the gas is dimensioned so that the flow cross section 8 given by the connection pipe 7 is not larger than this passage. This is attained by arranging the conically widened portion 12 of the steering column 1 so that it projects beyond the entrance cross section of the connection pipe 7. The struts 3 of the steering column 1 are advantageously dimensioned so that, in case of an impact of the vehicle, the steering column 1, 14 is provided with a yielding buckling zone.

The steering column 1, 14 is guided within the sleeve 10, which latter is fixedly joined to the connection pipe 7. For sealing the steering column, rubber sleeves or collars 5 are provided which are supported in the axial direction by ball bearings 6. The gaskets 5, designed to be compressible, are clamped within the sleeve 10 and do not have any fixed connection to the steering column 1, 14. Upon the beginning of a gaseous flow through the connection pipe 7, the gaskets 5 become gastight and thus prevent an afflux of the gas between the steering column and the sleeve, so that the gas is forced to flow through the gas entrance zone 2 and in between the struts 3 into the flow cross section 11 of the steering column 1 in the direction of arrow 9.

Figure 3:
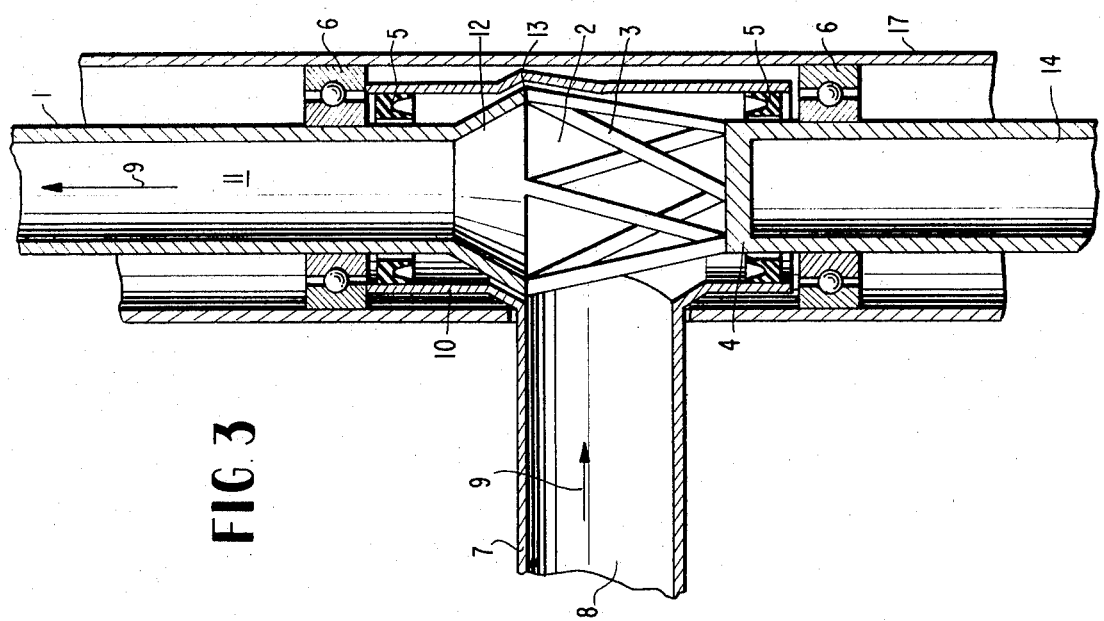

It is also possible to effect the sealing and guidance of the steering column 1, as shown in FIG. 3, by means of two sleeves, wherein the sleeve 10 adjacent the connection pipe 7 merely receives the gaskets 5, whereas the further external tube 17 takes over the rotatable mounting of the steering column 1 by means of the ball bearings 6.

While we have shown and described only several embodiments in accordance with the present invention, it is understood that the same is not limited thereto but also contemplates numerous changes and modifications as would be known to those skilled in the art given the present disclosure of the invention, and we therefore do not wish to be limited to the details shown and described herein only schematically but intend to cover all such changes and modifications.

We claim:

1. A gas conducting arrangement for conducting inflating gas from a gas pressure generating mechanism to an inflatable bag disposed in an automotive vehicle of the type having a steering column supporting a vehicle steering wheel, said bag being positioned for cushioning collision impacts when in an inflated condition; said arrangement comprising:
    hollow gas conducting space means formed inside said steering column and extending in the direction of the longitudinal axis of said steering column,
    and a connection pipe for feeding gas from said pressure generator into said hollow space means at a gas entrance zone of said steering column, said connection pipe being disposed at an angle to the longitudinal axis of the steering column at least in the area of said gas entrance zone,
    wherein the flow cross section of the hollow space means is smaller than the flow cross section of the connection pipe along a substantial portion of the longitudinal extent of said hollow space means, and wherein the flow cross section of the hollow space means is enlarged in the gas entrance zone to a size at least as great as the flow cross section of the connection pipe, and further
    wherein the steering column is formed with grid-like struts in the gas entrance zone with openings between said struts permitting passage of gas from said connection pipe to said hollow space means, which hollow space means is formed in part by said struts.

2. An arrangement according to claim 1, wherein the flow cross section of said hollow space means is conically widened in a transition portion immediately adjacent to said gas entrance zone.

3. An arrangement according to claim 2, wherein the enlarged portion of the flow cross section of the hollow space means projects beyond the entrance cross section of the connection pipe in a direction opposite the direction of flow through said hollow space means.

4. An arrangement according to claim 3, wherein said conically widened transition portion exhibits an annular rim at the widest part thereof, wherein said hollow space means is closed off in the direction toward the vehicle chassis by closing means at one side of the gas entrance zone, and wherein said struts extend between said rim and the closing means.

5. An arrangement according to claim 4, wherein said steering column is constructed with axially weakened parts in the gas entrance zone such that it buckles in the axial direction in the gas entrance zone in response to axial forces, and wherein said axially weakened parts include said struts.

6. An arrangement according to claim 5, wherein the connection pipe is integrally formed with a sleeve encompassing the steering column in the gas entrance zone, and wherein the steering column is mounted sealingly and rotatably in said sleeve.

7. An arrangement according to claim 2, wherein said conically widened transition portion exhibits an annular rim at the widest part thereof, wherein said hollow space means is closed off in the direction toward the vehicle chassis by closing means at one side of the gas entrance zone, and wherein said struts extend between said rim and the closing means.

8. An arrangement according to claim 1, wherein said steering column is constructed with axially weakened parts in the gas entrance zone such that it buckles in the axial direction in the gas entrance zone in response to axial forces.

9. An arrangement according to claim 8, wherein said axially weakened parts include said struts.

10. An arrangement according to claim 1, wherein the connection pipe is integrally formed with a sleeve encompassing the steering column in the gas entrance zone, and wherein the steering column is mounted sealingly and rotatably in said sleeve.

11. An arrangement according to claim 10, wherein said steering column includes a further sleeve circumferentially surrounding said first mentioned sleeve, wherein said hollow space means is constructed as a tubular member extending inside both of said sleeves.

12. An arrangement according to claim 11, wherein said tubular member is rotatably mounted in said further sleeve and sealed with respect to said first mentioned sleeve.

13. A gas conducting arrangement for conducting inflating gas from a gas pressure generating mechanism to an inflatable bag disposed in an automotive vehicle of the type having a steering column supporting a vehicle steering wheel, said bag being positioned for cushioning collision impacts when in an inflated condition; said arrangement comprising:
    hollow gas conducting space means formed inside said steering column and extending in the direction of the longitudinal axis of said steering column,
    and a connection pipe for feeding gas from said pressure generator into said hollow space means at a gas entrance zone of said steering column, said connection pipe being disposed at an angle to the longitudinal axis of the steering column at least in the area of said gas entrance zone, wherein the flow cross section of the hollow space means is smaller than the flow cross section of the connection pipe along a substantial portion of the longitudinal extent of said hollow space means, and wherein the flow cross section of the hollow space means is enlarged in the gas entrance zone to a size at least as great as the flow cross section of the connection pipe, and further
wherein the flow cross section of said hollow space means is conically widened in a transition portion immediately adjacent to said gas entrance zone.

14. An arrangement according to claim 13, wherein the enlarged portion of the flow cross section of the hollow space means projects beyond the entrance cross section of the connection pipe in a direction opposite the direction of flow through said hollow space means.

15. A gas conducting arrangement for conducting inflating gas from a gas pressure generating mechanism to an inflatable bag disposed in an automotive vehicle of the type having a steering column supporting a vehicle steering wheel, said bag being positioned for cushioning collision impacts when in an inflated condition; said arrangement comprising:
hollow gas conducting space means formed inside said steering column and extending in the direction of the longitudinal axis of said steering column,
and a connection pipe for feeding gas from said pressure generator into said hollow space means at a gas entrance zone of said steering column, said connection pipe being disposed at an angle to the longitudinal axis of the steering column at least in the area of said gas entrance zone,
wherein said steering column is contructed with axially weakened parts in the gas entrance zone such that it buckles in the axial direction in the gas entrane zone in response to axial forces.

16. A gas conducting arrangement for conducting inflating gas from a gas pressure generating mechanism to an inflatable bag disposed in an automotive vehicle of the type having a steering column supporting a vehicle steering wheel, said bag being positioned for cushioning collision impacts when in an inflated condition; said arrangement comprising:
hollow gas conducting space means formed inside said steering column and extending in the direction of the longitudinal axis of said steering column,
and a connection pipe for feeding gas from said pressure generator into said hollow space means at a gas entrance zone of said steering column, said connection pipe being disposed at an angle to the longitudinal axis of the steering column at least in the area of said gas entrance zone,
wherein the flow cross section of the hollow space means is smaller than the flow cross section of the connection pipe along a substantial portion of the longitudinal extent of said hollow space means, and wherein the flow cross section of the hollow space means is enlarged in the gas entrance zone to a size at least as great as the flow cross section of the connection pipe, and further
wherein said steering column is constructed with axially weakened parts in the gas entrance zone such that it buckles in the axial direction in the gas entrance zone in response to axial forces.

* * * * *